(12) United States Patent
Manning

(10) Patent No.: US 7,997,317 B2
(45) Date of Patent: Aug. 16, 2011

(54) HUB-ENCLOSED TIRE PUMP

(76) Inventor: Kevin Manning, Oakland, CA (US)

(*) Notice: Subject to any disclaimer, the term of this patent is extended or adjusted under 35 U.S.C. 154(b) by 296 days.

(21) Appl. No.: 12/335,211

(22) Filed: Dec. 15, 2008

(65) Prior Publication Data

US 2009/0151835 A1   Jun. 18, 2009

Related U.S. Application Data

(60) Provisional application No. 61/013,920, filed on Dec. 14, 2007, provisional application No. 61/080,754, filed on Jul. 15, 2008.

(51) Int. Cl.
*B60C 23/10* (2006.01)
(52) U.S. Cl. ........................ 152/421; 152/419
(58) Field of Classification Search .......... 152/415–419, 152/421, 422
See application file for complete search history.

(56) References Cited

U.S. PATENT DOCUMENTS

| | | | |
|---|---|---|---|
| 624,417 A | 5/1899 | Wickersham | |
| 652,997 A | 7/1900 | Crandall | |
| 664,281 A * | 12/1900 | Loebinger | 152/421 |
| 674,722 A * | 5/1901 | Andersen | 152/421 |
| 713,667 A * | 11/1902 | Nielsen et al. | 152/419 |
| 744,483 A | 11/1903 | Carlberg | |
| 767,912 A * | 8/1904 | Nielsen | 152/419 |
| 1,016,364 A * | 2/1912 | Rodway et al. | 152/421 |
| 1,804,192 A * | 5/1931 | Wilson | 152/421 |
| 2,391,652 A * | 12/1945 | Stevenson | 152/421 |
| 2,415,618 A | 2/1947 | West | |
| 5,318,317 A | 6/1994 | Hopper | |
| 5,342,177 A | 8/1994 | Cheng | |
| 5,667,606 A | 9/1997 | Renier | |
| 5,898,965 A | 5/1999 | Chuang | |
| 6,772,812 B1 | 8/2004 | Hamilton | |
| 7,059,372 B1 | 6/2006 | McKoy | |
| 7,124,789 B2 | 10/2006 | Nakano | |

OTHER PUBLICATIONS

Building a Better Bicycle, Science and Technology, Trends in Japan, Web Japan, Mar. 22, 2004.

* cited by examiner

*Primary Examiner* — Russell Stormer
(74) *Attorney, Agent, or Firm* — Gonzales Patent Services; Ellen Gonzales

(57) ABSTRACT

A tire pump that is housed within the hub of a wheel is described. The pump includes a piston that moves axially with respect to the wheel's axle. The pump also includes a pressure switch configured to stop the pump when sufficient tire pressure is reached.

7 Claims, 9 Drawing Sheets

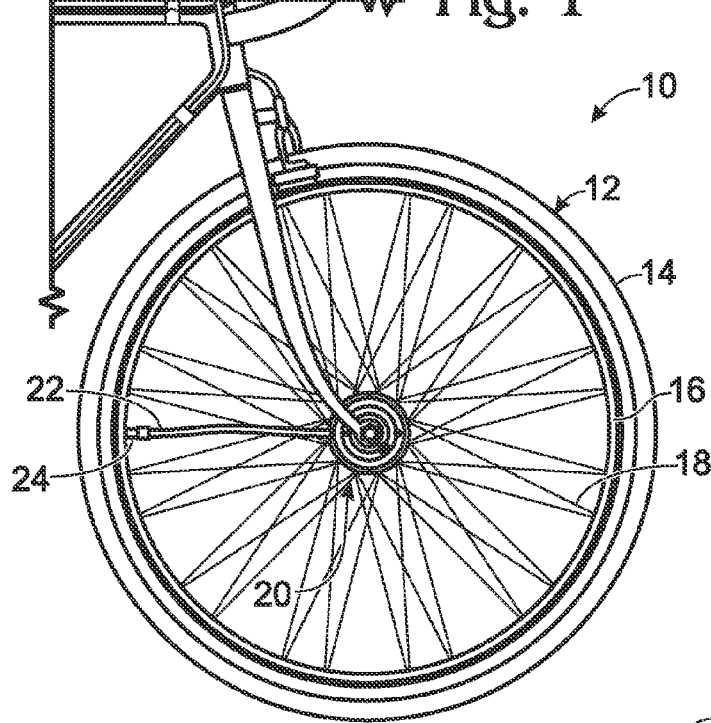
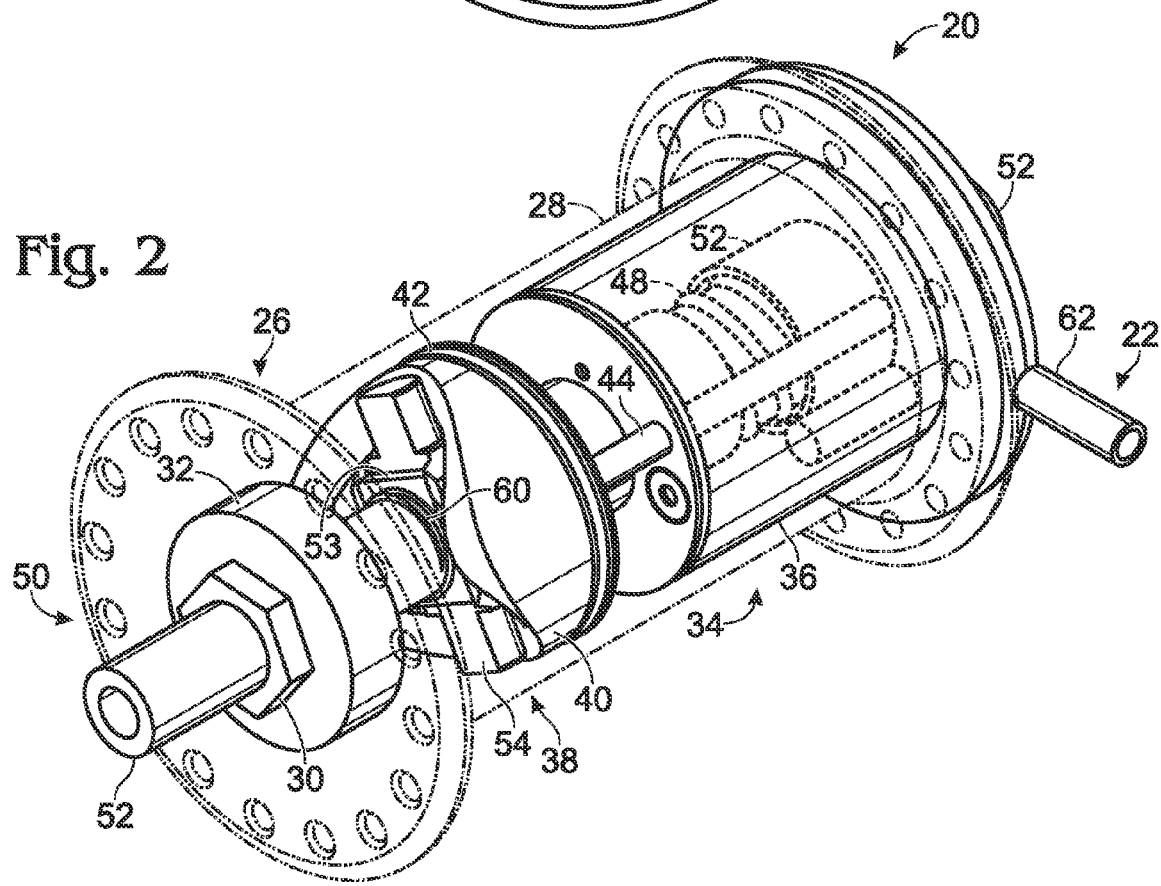

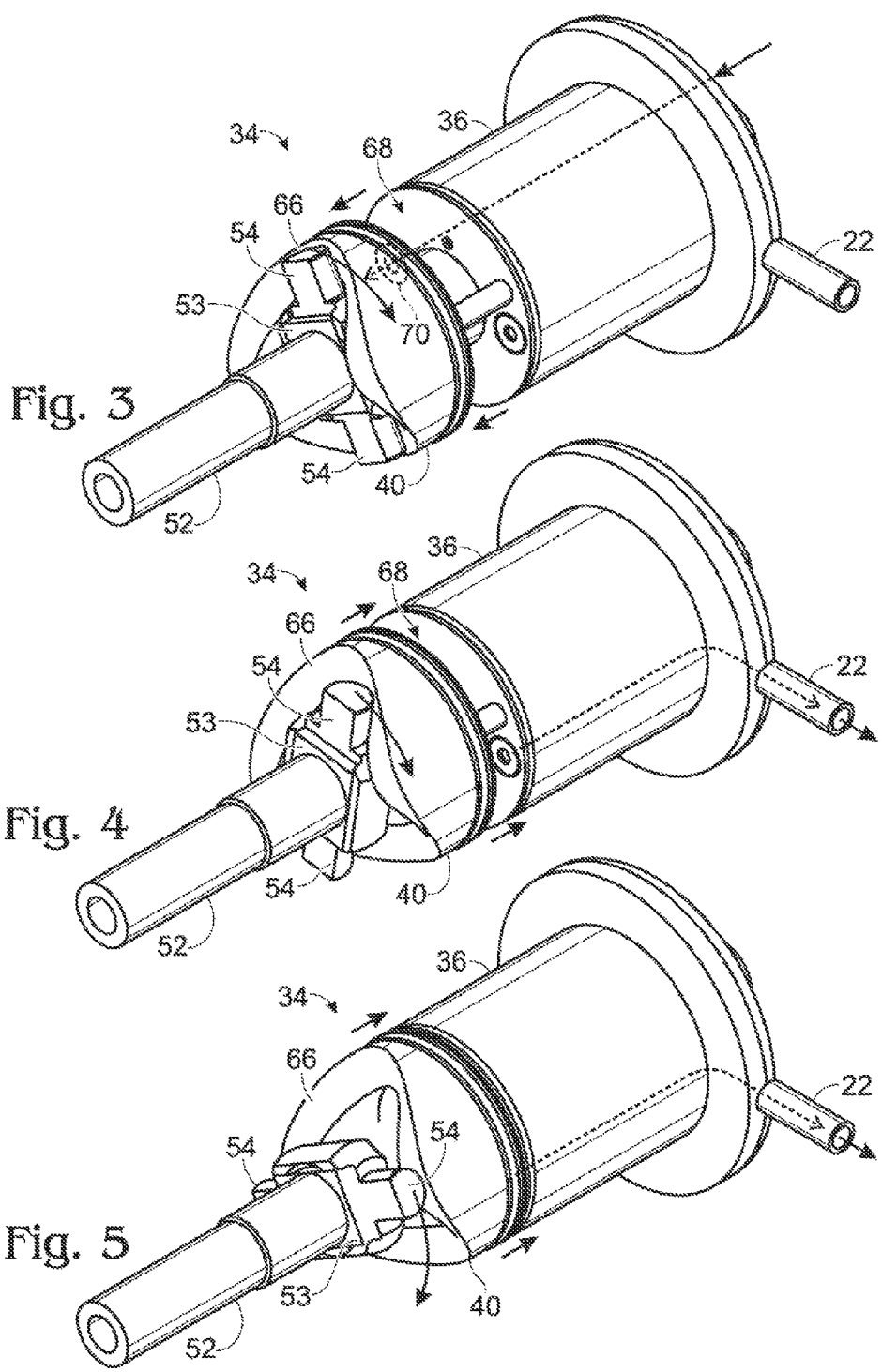

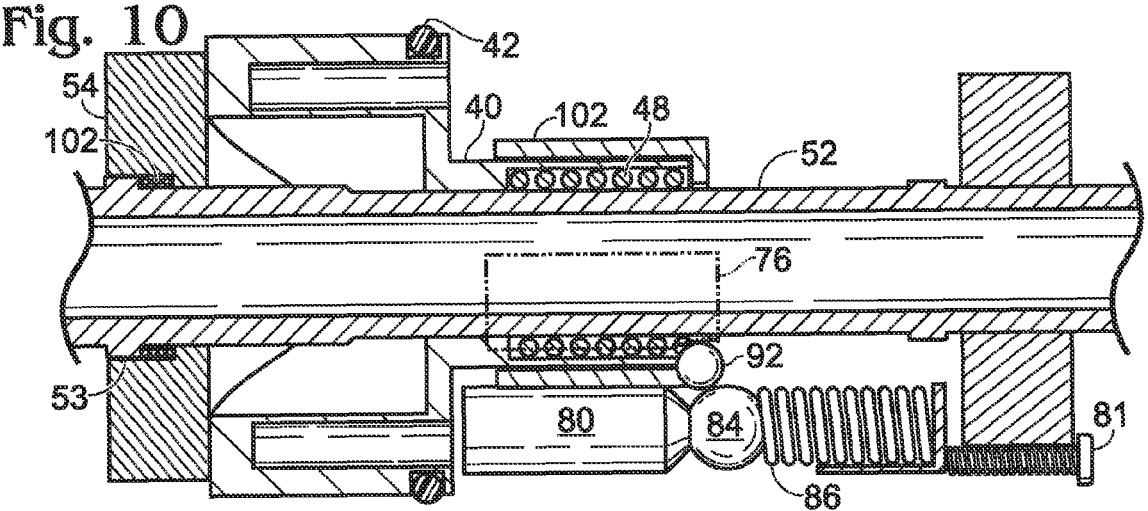
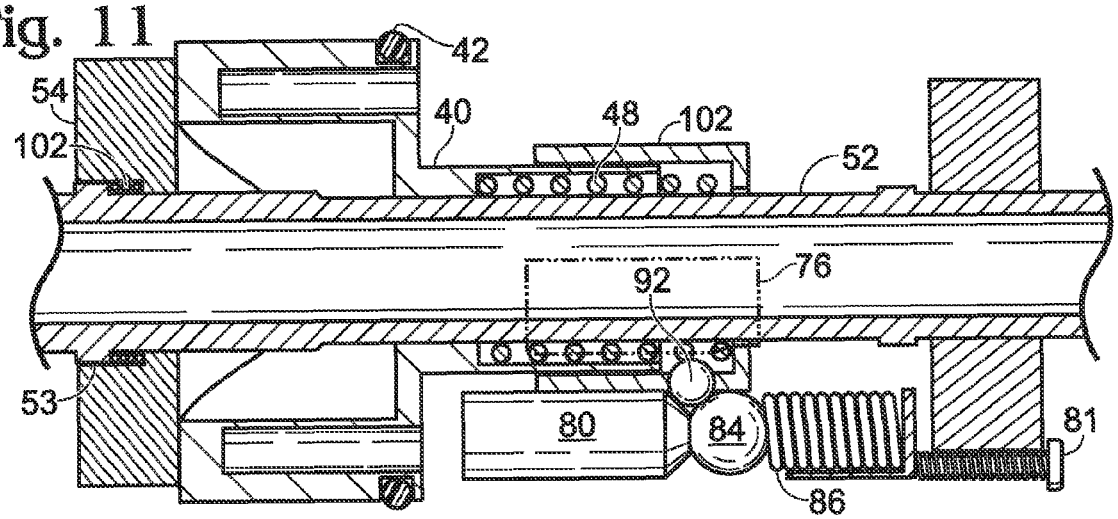
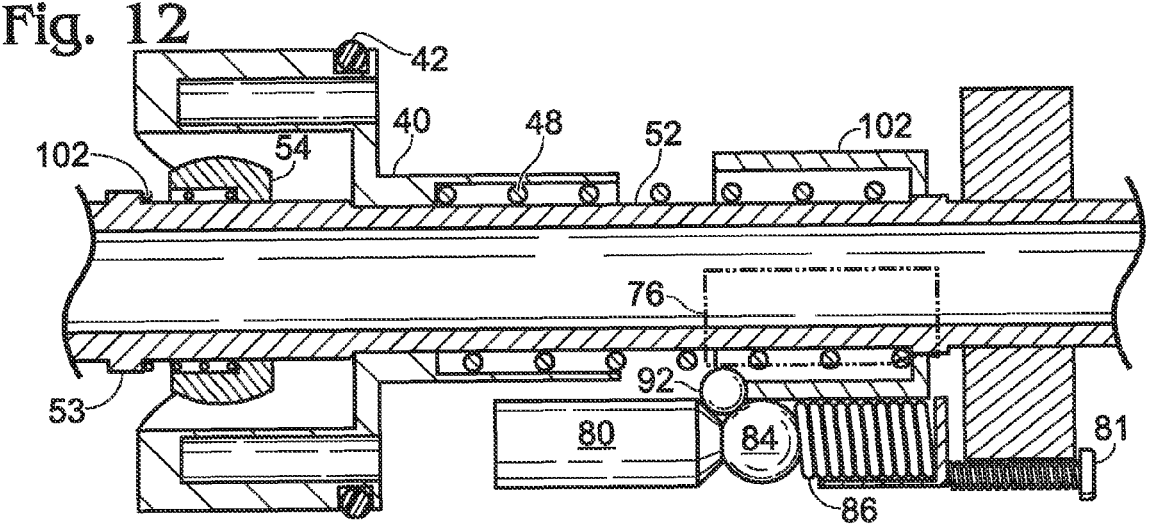

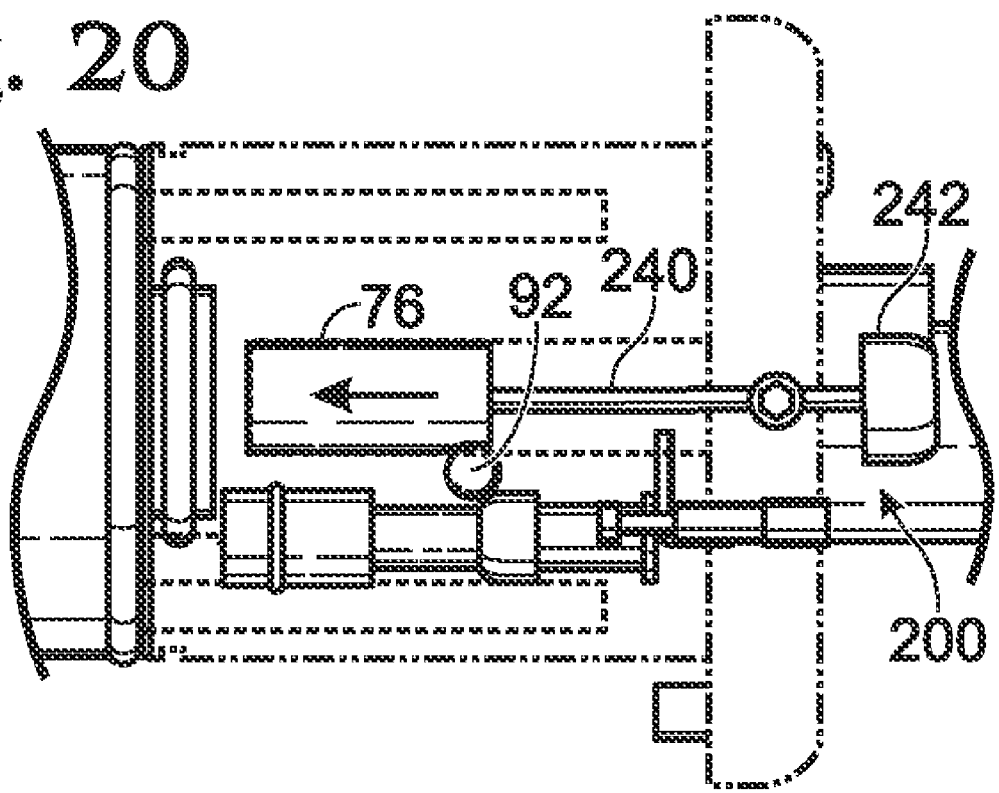

HUB-ENCLOSED TIRE PUMP

CROSS-REFERENCE TO RELATED APPLICATIONS

This application claims the benefit of U.S. Provisional Patent Application Nos. 61/013,920, filed Dec. 14, 2007 and 61/080,754, filed Jul. 15, 2008, each of which is incorporated by reference in its entirety.

BACKGROUND

Flat tires are a common problem experienced by bicycle riders of all ages and experience levels. Riders are frequently in need of a pump to inflate their tires. Various wheel mounted tire pumps have been previously described and many of these pumps rely on the rotation of the tire as the source of power for the pump. For example U.S. Pat. Nos. 624,417, 652,997, 744,483, 5,342,177, 5,898,965 and 7,124,789 all describe wheel mounted tire pumps that are attached or mounted in one way or another to the wheel's axle and then extend radially away from the axle (i.e. towards the rim of the tire). These designs have a significant flaw in that they alter both the aerodynamic properties and the balance of the wheel. U.S. Pat. Nos. 2,415,618 and 5,667,606 describe automobile tire pumps that are mounted on the outside of the wheel's hub. While the pump described in the '606 patent employs movement that is substantially aligned axially to the wheel's axis, the design requires a weighted pendulum that extends downwards away from the pump. Both the '618 and '606 pumps are large and bulky and unsuitable for use with a bicycle or other light-weight vehicle, as the problems related to weight and balance and aerodynamics are only compounded by their design. Other proposed designs such as those described in U.S. Pat. Nos. 5,318,317 and 7,059,372 are similarly unwieldy.

BRIEF DESCRIPTION OF THE DRAWINGS

FIG. 1 is an overview drawing of a bicycle including an in-hub tire pump.

FIG. 2 depicts a close-up view of a tire pump according to an a first embodiment of the present disclosure.

FIG. 3 is a detailed view of the pump of FIG. 2 showing the pump in the full open, or expanded, position.

FIG. 4 is a detailed view of the pump of FIG. 3 showing the pump in the compression phase.

FIG. 5 is a detailed view of the pump of FIG. 3 showing the pump in the in the fully closed, or contracted, position.

FIG. 10 is a cross-sectional partial view of the pump in the position shown in FIG. 7 rotated to show the operation of the switch release sleeve more clearly.

FIG. 11 is a cross-sectional partial view of the pump in the position shown in FIG. 8 rotated to show the operation of the switch release sleeve more clearly.

FIG. 12 is a cross-sectional partial view of the pump in the position shown in FIG. 9 rotated to show the operation of the switch release sleeve more clearly.

FIG. 19 is a close-up partial view of the pump of FIG. 13 rotated around the longitudinal axis showing the cocking mechanism as it is maneuvered into position to cock the switch release pin and turn the pump on.

FIG. 20 is a close-up partial view of the pump of FIG. 13 rotated around the longitudinal axis showing the cocking mechanism moving the switch release pin into position in order to start the pump.

DETAILED DESCRIPTION

Figure 6:
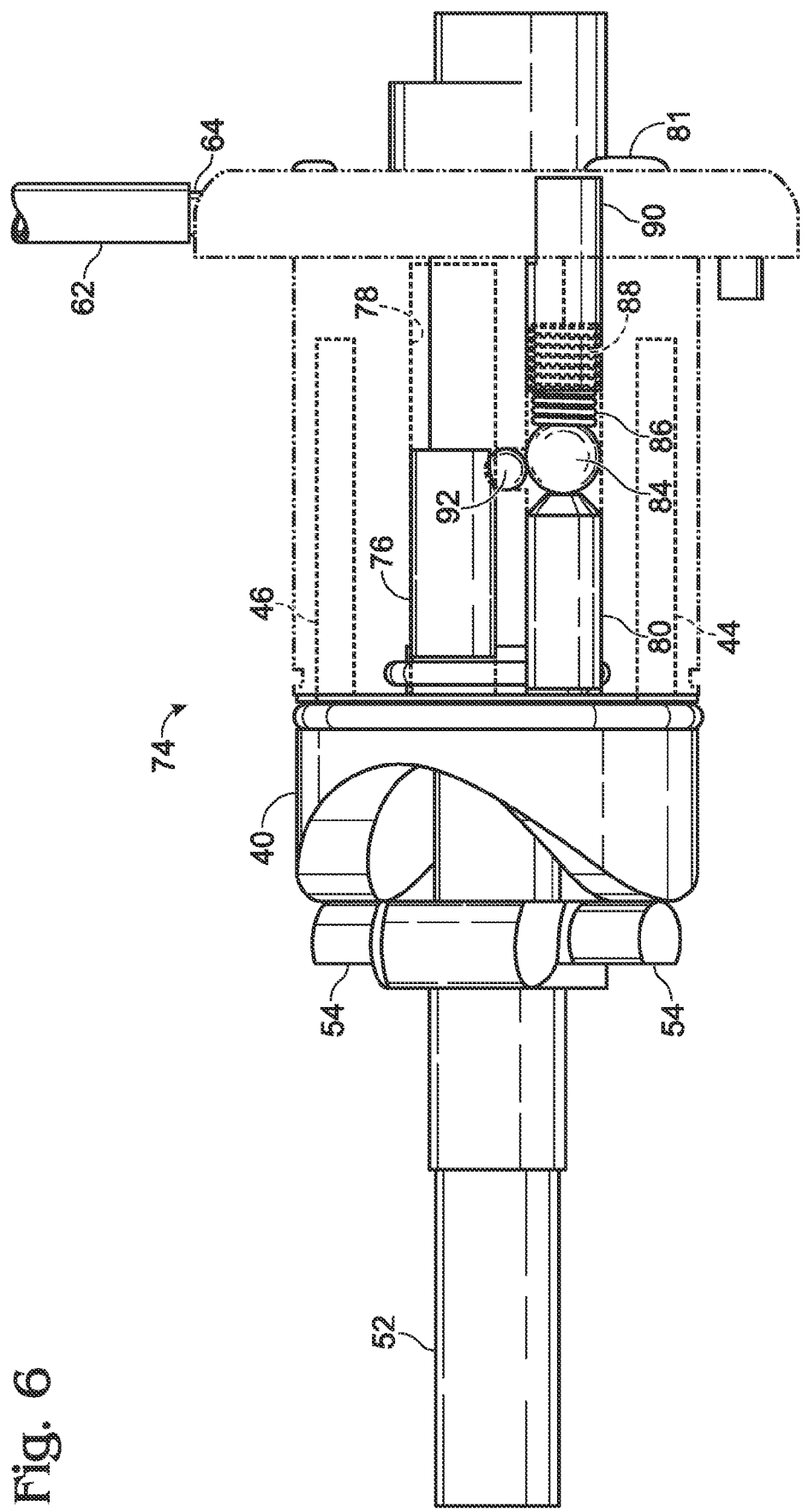
FIG. 6 is an elevation view of the pump shown in FIG. 2.

The present disclosure provides an in-hub tire pump, wherein the body of the pump is housed within the wheel hub. It should be understood that while the pump of the present disclosure may be described as being particularly useful for a bicycle tire, it will be appreciated that the presently-described pump may be a useful means of inflation for other types of tires or other inflatable objects, whether or not those objects are used in connection with a bicycle, tricycle, scooter, wheelchair, motorcycle, or other object. According to one embodiment, unlike previously described on-board tire pumps wherein the pump is located on the exterior of the hub and/or the piston moves in a radial direction relative to the wheel's axle, the presently-described in-hub pump employs a piston which is located entirely within the wheel's hub and which moves axially relative to the wheel's axle. Accordingly, the presently-described pump provides a more compact and aerodynamic pump which is much more practical for uses where weight and center of gravity are of particular importance, such as two wheeled and/or light-weight vehicles such as bicycles. Furthermore, unlike some previously described pumps, wherein the pump continues to operate even after a desired pressure is reached (typically, pressurized air is vented to the outside of the pump in this situation), one embodiment of the presently-described pump includes a switch mechanism configured to turn the pump off once a desired tire pressure has been reached. Moreover, when off, the pump creates no noticeable frictional drag.

Turning first to FIG. 1, the lower front portion of a bicycle 10 can be seen. It will be understood that while for illustrative purposes the pump is shown in the hub of the front wheel, the presently-described pump could also or alternatively be placed in the rear wheel hub. As shown, bicycle 10 includes a wheel assembly 12 including a tire 14, a rim 16, spokes 18 and a hub pump assembly 20. Extending from hub pump assembly 20 is an air hose assembly 22, which is shown connected to an air valve 24 in tire 14.

Turning now to FIG. 2, a close up view of hub pump assembly 20 is shown. Hub pump assembly 20 includes a pumping mechanism 34, piston assembly 38, an axle assembly 50 and the previously mentioned air hose assembly 22. As shown in FIG. 2, hub shell assembly 26 includes a hub shell 28 (shown in dashed lines), an axle nut 30, and a bearing 32. A more detailed description of various components and an exemplary mode of operation of the pumping mechanism 34 is shown and described below in reference to FIGS. 3-5. Piston assembly 38 includes piston 40, o-ring 42, a pair of pins 44, 46 (the second piston pin 46 is hidden behind piston 40 in FIG. 2) and piston spring 48. Axle assembly 50 includes axle 52, actuator 54, and actuator spring 60. Air hose assembly includes an airline 62 and an air fitting 64 (as shown in FIG. 6).

Turning now to FIGS. 3-5, the operation of the pumping mechanism 34 is described. For the viewer's convenience, the outer shell, hub axle nut and hub bearing have been removed from the remainder of the drawings. When the pump is on, actuator 54 is fixed to axle 52 such that rotation of axle 52 results in rotation of actuator 54. As shown, the distal surface 66 of piston 40 is shaped to form a cam which is mechanically engaged with actuator 54. Accordingly, as actuator 54 rotates with axle 52, the movement of actuator 54 along the distal surface of piston 40 translates the rotational motion of the wheel axle 52 into reciprocating axial movement of the piston. Under these conditions, the piston is prevented from rotating with the axle by pins 44 and 46, which slide in and out of the holes in the pump assembly head 36. As shown, pump assembly head 36 is locked to hub shell assembly 26.

In FIG. 3, the pump assembly is in its open, or expanded position. Actuator 54 is seated within the receded portion of the cammed surface of piston 40, allowing piston 40 to be at its maximum distance away from hub head 36, resulting in an air chamber 68.

In FIG. 4, rotation of axle 52 has resulted in actuator 54 beginning to ride up the slope of the cammed surface of piston 40. This forced the piston to move towards hub head 36, compressing the air in air chamber 68. Eventually, the pressure created by the compressed air will be sufficient to drive the air in chamber 68 out through check valve 72, through hub head 36, out air hose assembly 22, and into tire 14.

In FIG. 5, actuator 54 has reached the apex of the cammed surface of piston 40. Piston 40 abuts hub head 36, and the air in air chamber 68 has been forced out of check valve 72.

Though not shown, it will be understood that as axle 52 continues its rotation, actuator 54 will then travel down the slope of the cammed surface of piston 40, which is urged away from hub head 36 via piston spring 48 (shown in FIG. 2). As actuator 54 moves away from hub head 36, creating air chamber 68, it produces a vacuum inside of air chamber 68. Air enters air chamber 68 via check valve 70 to fill the vacuum, and the pump assembly has cycled through to the position shown in FIG. 3 (though on the opposite side of the cam.)

As the axle continues to rotate, the cycle repeats itself, pumping air into the tire.

According to an embodiment, the presently-described pump further includes a switch assembly configured to deactivate the pump when the tire has reached a sufficient and/or desired pressure. FIG. 6 provides an overview of a switch assembly 74 according to an embodiment of the present invention. As shown, the switch assembly includes a switch release pin 76 which travels inside a switch release pin channel 78, and a switchpin 80, which travels inside a switchpin channel 82. The switchpin is operably engaged with a switchball 84, which is urged towards the switchpin via a switch spring 86. Switch spring 86 resides within a switch spring sleeve recess 88 inside of switch sleeve 90. Switchball 84 is also operably engaged with switch release ball 92, which in turn, is operably engaged with switch release pin 76.

Figure 7:
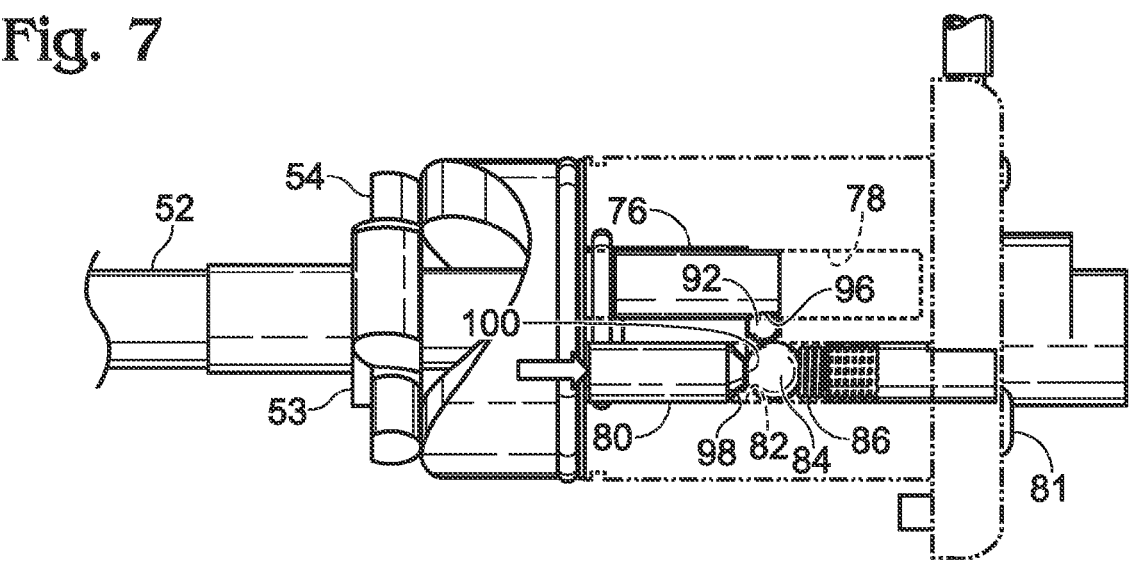
FIG. 7 is a close-up partial view of the pump of FIG. 6 showing the switch mechanism in an open, or unlocked, position.
Figure 8:
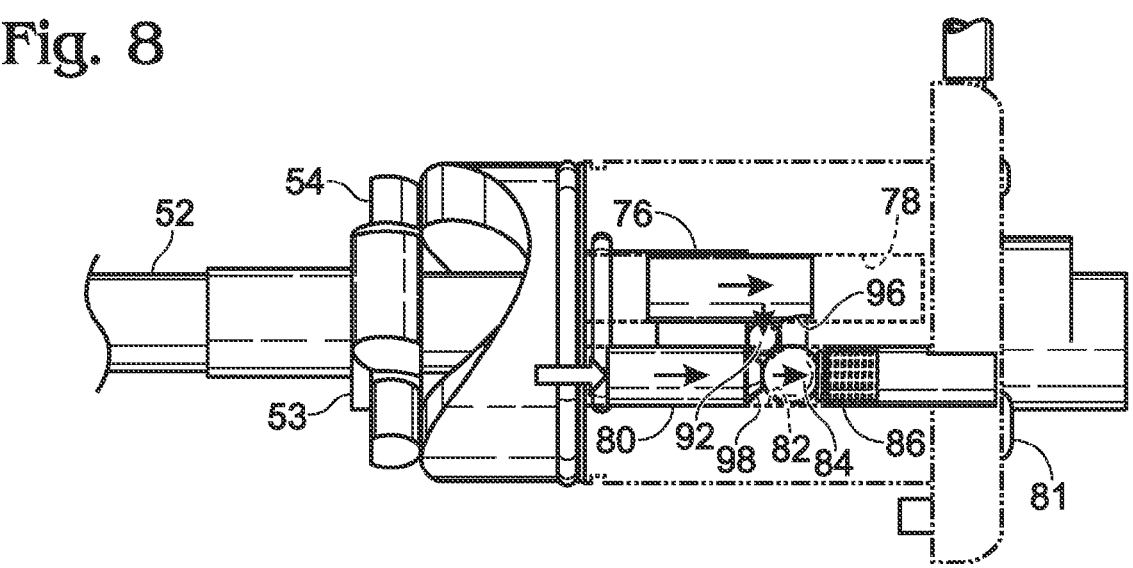
FIG. 8 is a close-up partial view of the pump showing the switch mechanism as it is moving from the open, or unlocked, position of FIG. 7 to the closed, or locked, position of FIG. 9.

Turning now to FIGS. 7-12, the operation of the switch assembly is described. FIG. 7 is a close-up partial view of the pump showing the switch mechanism in an open, or unlocked, position, during which the pump is "on" and operates to inflate the tire. FIG. 10 is a cross-sectional partial view of the pump in the position shown in FIG. 7 rotated to show the operation of the switch release sleeve 102 more clearly. FIG. 8 is a close-up partial view of the hub pump assembly showing the switch mechanism as it is moving from the open, or unlocked, position of FIG. 7 to the closed, or locked, position of FIG. 9, wherein the pump is "off." FIG. 11 is a cross-sectional partial view of the pump in the position shown in FIG. 8 rotated to show the operation of the switch release pin sleeve more clearly. FIG. 12 is a cross-sectional partial view of the pump in the position shown in FIG. 9 rotated to show the operation of the switch release pin sleeve more clearly.

As described above, as the pump's piston reciprocates, it puts pressure on check valve 72 which eventually releases air into the air hose and then into the tire. Moreover, as air accumulates in air chamber 68, it also puts pressure on switchpin channel 82. The pressure urges switchpin 80 into its associated channel. It can be seen that in the configuration shown in FIG. 7, the switch release pin is held in place by switch release ball 92, which partially blocks the switch release pin's entry into the switch release pin channel. As shown, the end of switch release pin 76 has a slightly contoured surface 96 (perhaps best seen in FIGS. 8 and 9), which allows it to be held in place by the switch release ball until the tire reaches sufficient tire pressure. The switchpin is held in check via the resistance of the switchspring 86 pushing against switchball 84.

Turning to FIG. 10, it can be seen that in this position, the switch release sleeve 102, significantly overlaps the terminal end of piston 40. It should be understood that switch release sleeve 102 moves in concert with switch release pin 76. In some embodiments they may be a single solid component and in other embodiments they may be two components fixed relative to one another. For ease of description, switch release pin 76 is shown in dashed lines though it will be understood that in the angle shown in FIG. 10 the switch release pin 76 is actually behind the switch release sleeve and would normally be obscured thereby.

In the depicted embodiment, piston 40 and switch release sleeve 102 are urged apart by piston spring 48, but the placement of switch release ball 92, prevents them from separating. Moreover, it can be seen in FIG. 10 that while actuator 54 is in physical communication with the cammed end of piston 40, it is urged by piston 40 against locking flats 53, which extend radially outward from axle 52, thereby locking actuator 54 against axle 52 and forcing it to move therewith. It can be seen that a small cavity exits between locking flats 53 and actuator 54 and that a spring 102 is housed therein. Generally it can be seen that in this position, the tension of spring 102 is not sufficient to overcome the strength of the piston forcing the actuator into a locked relationship with the axle.

Turning now to FIGS. 8 and 11, when the terminal tire pressure (i.e. the tire pressure at which the pump mechanism is turned off) has been reached, the pressure against the switch pin 80 is great enough to compress the switch spring 86 into the switch spring sleeve recess 88. It will be appreciated that the desired terminal tire pressure may be selected by adjusting the tension of switch spring 86. For example, when a higher terminal tire pressure is desired, screw 81 may be tightened, thereby compressing spring 86 and increasing the strength of the spring, thereby increasing the pressure required in order for switch pin 80 to be able to further compress the switch spring. Conversely, when a lower terminal tire pressure is desired, screw 81 may be loosened, thereby decompressing switch spring 86 and decreasing the strength of the spring, thereby decreasing the pressure required to enable switch pin 80 to compress the switch spring. Such adjustments may be made manually, for example, by turning screw 81 with a screwdriver. Alternatively, while not shown, it will be appreciated that the movement of screw 81 may be adjusted using some other mechanical means. Furthermore, it will be appreciated that such mechanical means could be under the control of an electronic apparatus which could similarly be in communication with an electronic pressure gauge or some other useful mechanism.

As perhaps best seen in FIG. 11, movement of switchpin 80 and the associated compression of switchspring 86 allows the switch release ball 92 to seat itself with the recess 100 (identified in FIG. 7) created by the tapered shape 98 (identified in FIGS. 7-9) of the switchpin and the contoured surface of the switchball, thereby releasing switch release pin 76, associated switch release sleeve 102, and piston 40 to move in response to the urging of piston spring 48. Accordingly, switch release pin sleeve 102 and piston 40 begin to separate.

Figure 9:
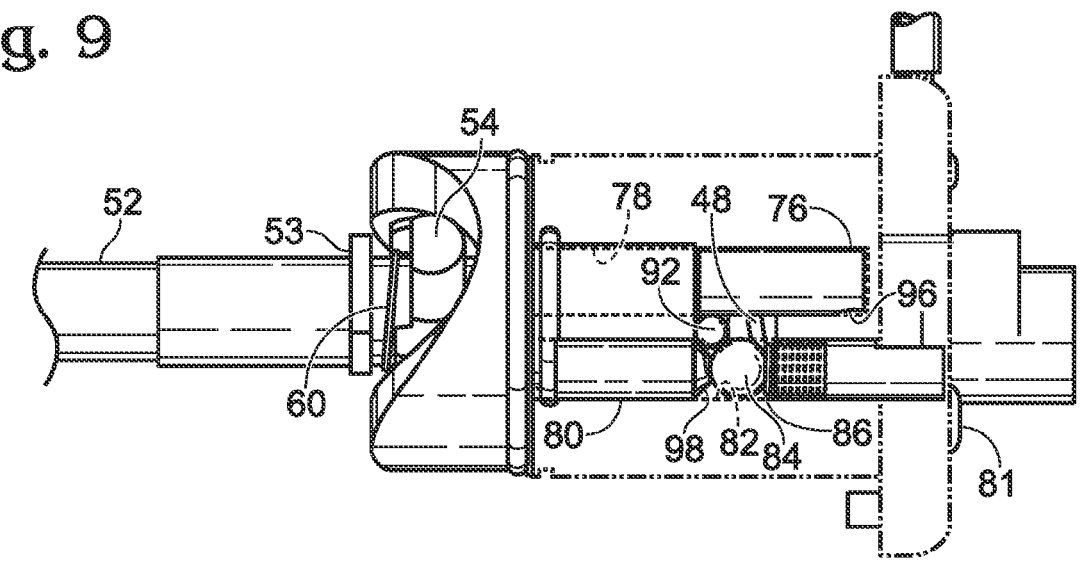
FIG. 9 is a close-up partial view of the pump showing the switch mechanism in a closed, or locked, position.

It will be remembered that at this time actuator 54 is still locked to and therefore rotating with axle 52. However, as piston 40 and switch release pin sleeve 102 are released from their engagement with each other, the piston fails to return all the way to the bottom of its stroke. At this time, the actuator spring 60 urges the actuator 54 away from locking flats 53 and the configuration shown in FIGS. 9 and 12 is reached. At this point, the piston, actuator, and axle are completely uncoupled from each other and the piston no longer engages in reciprocating movement. The pump is now off and the pump is able to rotate without placing any noticeable drag on the axle.

Turning now to FIGS. 13-20, another embodiment of a hub pump assembly is shown. It will be understood that the variously described embodiments provide numerous elements which can be combined, as desired, to produce a hub pump assembly according to the present disclosure. Accordingly, the present disclosure is not limited to only the specific embodiments shown, but further includes various combinations and subcombinations of the presently described embodiments. For ease of understanding, those elements which are identical to those described in the embodiment above are given the same numerical identifiers, while elements which provide functions similar to those of elements in the previously described embodiment are given the numerical identifier proceeded with the number "1" (e.g. switch ball 84 in the embodiment shown in FIG. 6 is replaced by element 186 in the embodiment shown in FIG. 13).

Figure 13:
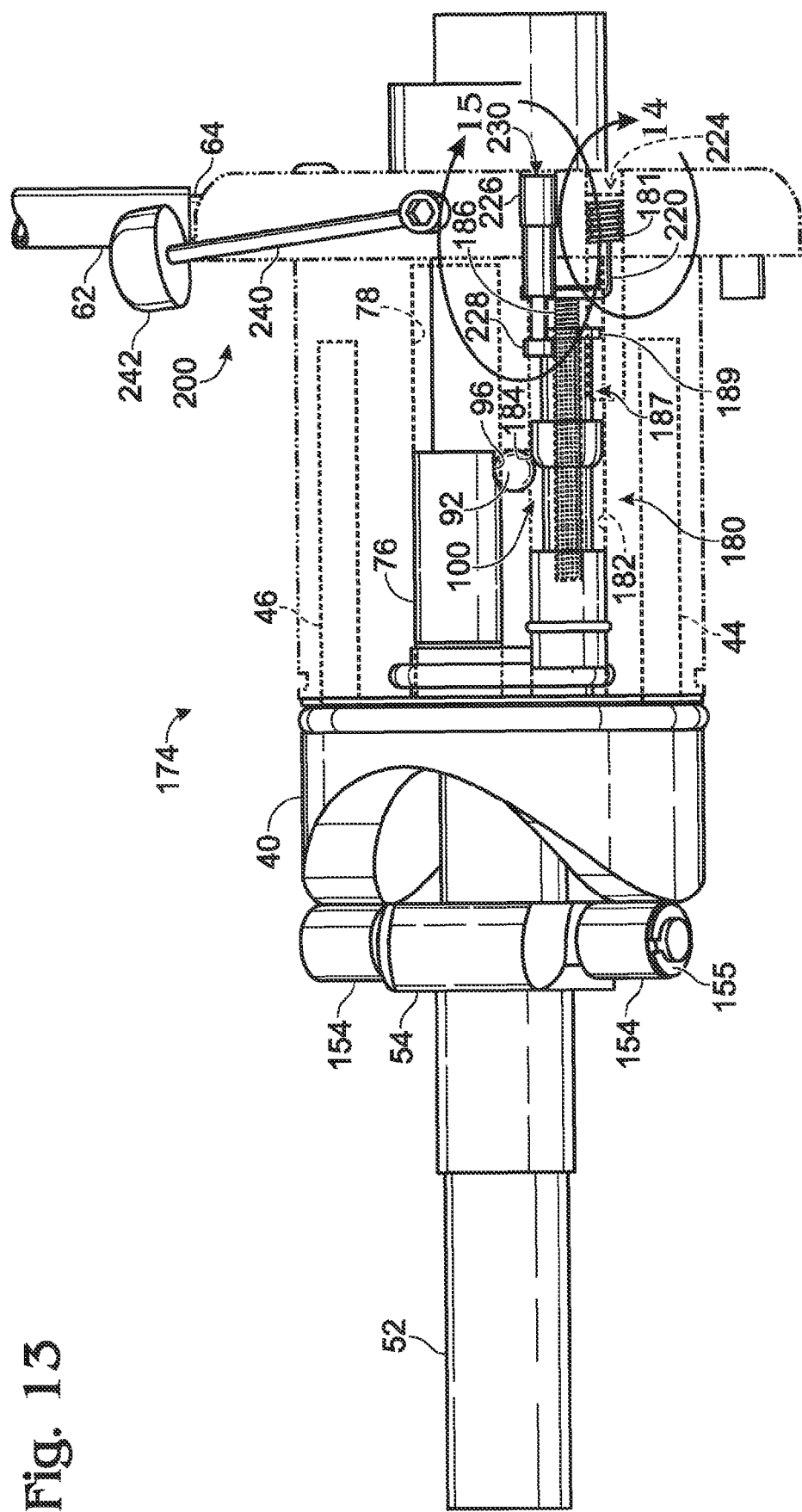
FIG. 13 is an elevation view of a second embodiment of a pump according to the present disclosure.

Initially reviewing FIG. 13, it can be seen that the actuator 54 from FIG. 6 now includes rollers 154. These rollers help to limit or prevent metal scrape under high load conditions. In the depicted embodiment, snap rings 155 are utilized to keep the rollers in place, however, any suitable mechanism may be used.

As also shown in FIG. 13, a cocking mechanism 200 is shown. As described in detail with respect to FIGS. 18-20, the cocking mechanism can be used to reset the pump and return it to the on position.

Still reviewing FIG. 13, an alternate switch assembly 174 is shown. As shown, switch assembly 174 includes a switch release pin 76 which travels inside a switch release pin channel 78, and a switchpin 180, which travels inside a switchpin channel 182. The switchpin 180 includes a rounded larger circumferential surface 184, which includes a rounded surface that is operably engaged with switch release ball 92, which in turn, is operably engaged with switch release pin 76. Switchpin 180 further includes a waist region 187, and a lip 189. Switch spring 186 resides within switch pin 180. Viewing FIG. 13, the right end of switch spring 186 is engaged with an L-shaped rod 220, which extends from a set screw 181. Set screw 181 is accessible to the outside of the pump via hole 224. Accordingly, a user can insert a screw driver into hole 224, engage set screw 181 in order to move the L-shaped rod forward or backward (i.e. to the left or right in the figure). Movement of the L-shaped rod allows the user to adjust the minimum and maximum pressure setting for the tire, as described in greater detail below.

Figure 14:
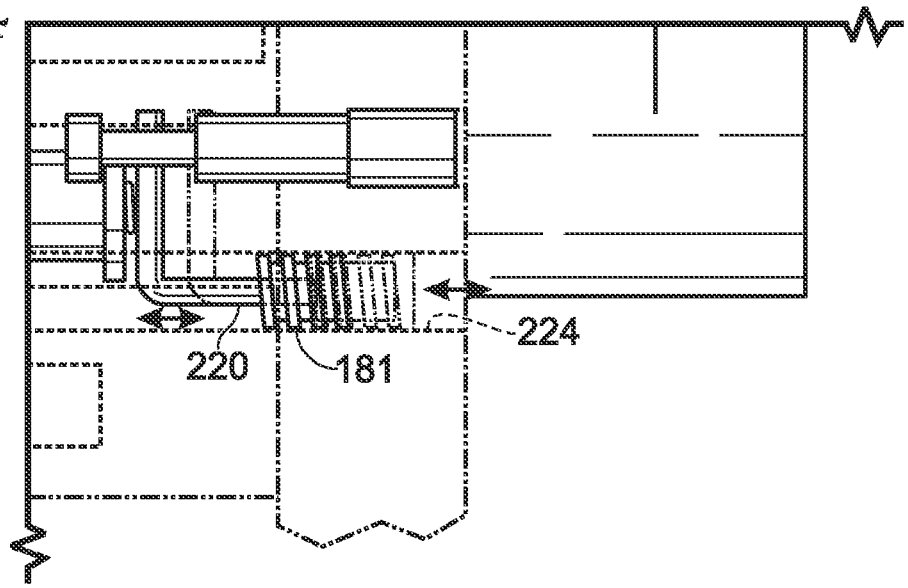
FIG. 14 is a close-up partial view of the pump of FIG. 13 at 14 showing the adjustment of L-shaped bar 220.
Figure 15:
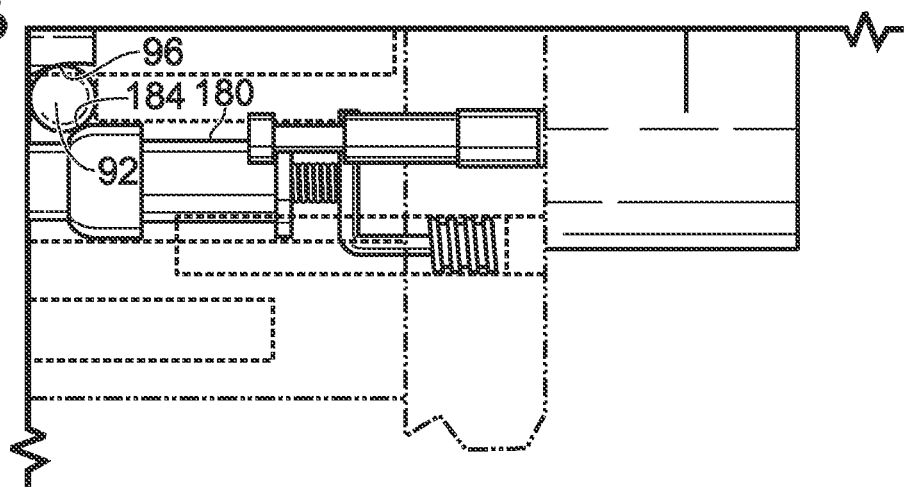
FIG. 15 is a close-up partial view of the pump of FIG. 13 at 15 showing the switch mechanism in the open or unlocked position.
Figure 16:
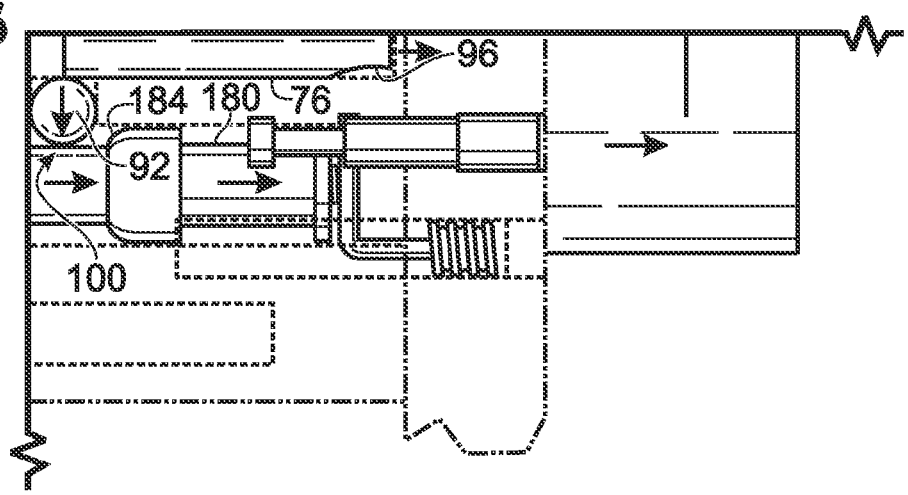
FIG. 16 is a close-up partial view of the pump of FIG. 13 at 15 showing the switch mechanism in the closed or locked position.

Turning now to FIGS. 13-16 as a whole, the operation of the switch assembly 174 is described. FIG. 14 is a close-up partial view of the pump of FIG. 13 at 14 showing the adjustment of L-shaped bar 220. FIG. 15 is a close-up partial view of the pump of FIG. 13 at 15 also showing the switch mechanism in the open or unlocked position. FIG. 16 is a close-up partial view of the pump of FIG. 13 at 15 showing the switch mechanism in the closed or locked position.

As described above, as the pump's piston reciprocates, it puts pressure on check valve 72 which eventually releases air into the air hose and then into the tire. Moreover, as air accumulates in air chamber 68, it also puts pressure on switchpin channel 182. The pressure urges switchpin 180 into its associated channel (i.e. towards the right of the figure). It can be seen that in the configuration shown in FIG. 13, the switch release pin 76 is held in place by switch release ball 92, which partially blocks the switch release pin's entry into the switch release pin channel 78. As shown, the end of switch release pin 76 has a slightly contoured surface 96 (perhaps best seen in FIGS. 15 and 16), which allows it to be held in place by the switch release ball until the tire reaches sufficient tire pressure. The switchpin is held in check via switch off pin 226. Switchpin 180 is held in place by the resistance of the switchspring 186 pushing against L-shaped bar 220.

Turning now to FIGS. 14-16, when the terminal tire pressure (i.e. the tire pressure at which the pump mechanism is turned off) has been reached, the pressure against the switch pin 180 is great enough to compress the switch spring 186 against L-shaped bar 220. It will be appreciated that the desired terminal tire pressure may be selected by adjusting the position of L-shaped bar 220 via set screw 181, as shown in FIG. 14. For example, when a higher terminal tire pressure is desired, screw 181 may be tightened, moving L-shaped bar 220 to the left of the figure and thereby compressing spring 186 and increasing the strength of the spring, thereby increasing the pressure required in order for switch pin 180 to be able to further compress the switch spring. Conversely, when a lower terminal tire pressure is desired, set screw 181 may be loosened, thereby moving L-shaped bar 220 to the right of the figure, decompressing spring 186 and decreasing the strength of the spring, thereby decreasing the pressure required to enable switch pin 80 to compress the switch spring.

Similar to the embodiment shown in FIG. 6, and as best seen by comparing FIGS. 15 and 16, once the terminal tire pressure is reached, switch release ball 92 is able to slip off of the contoured surface 184 of switchpin 76 and seat itself within space 100, thereby allowing switch release pin 76, associated switch release sleeve 102, and piston 40 to move in response to the urging of piston spring 48. Accordingly, switch release pin sleeve 102 and piston 40 begin to separate.

As with the previously described embodiment, at this time actuator 54 is still locked to and therefore rotating with axle 52. However, as piston 40 and switch release pin sleeve 102 are released from their engagement with each other, the piston fails to return all the way to the bottom of its stroke. At this time, the actuator spring 60 urges the actuator 54 away from locking flats 53 and the piston, actuator, and axle are completely uncoupled from each other. Accordingly, the piston no longer engages in reciprocating movement and the pump is now off and able to rotate without placing any noticeable drag on the axle.

Figure 17:
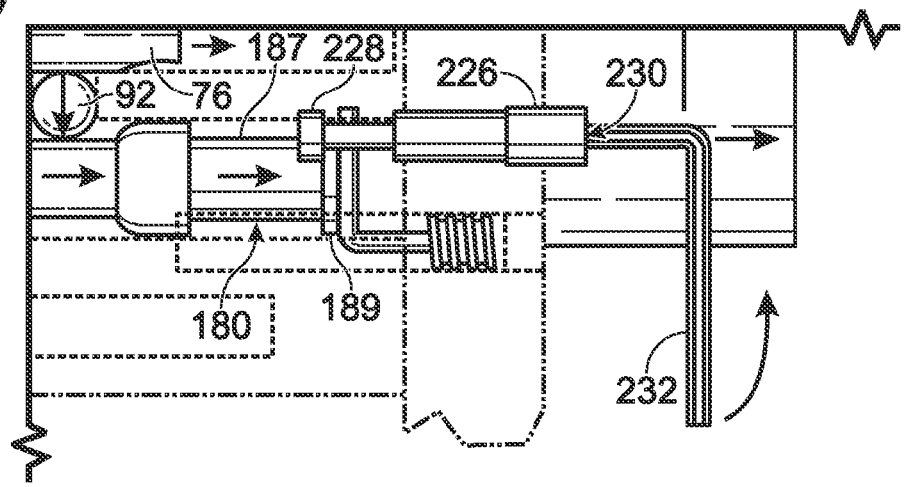
FIG. 17 is a close-up partial view of the pump of FIG. 13 at 15 showing the switch mechanism as it is being manually shut off.

Turning now to FIG. 17, in some cases, it may be desirable to manually shut off the pump. This may happen, for example, when the tire or tube has a puncture that prevents it from being filled. Accordingly, the presently described pump may include a manual shut off mechanism. FIG. 17 is a close-up partial view of the pump of FIG. 13 at 15 showing a mechanism for manually shutting off the switch mechanism. Accordingly, switch assembly 174 may further include a switch off pin 226 which can be used to manually override the pump and turn it off. Switch off pin 226 includes a head 228 which is configured to seat within waist region 187 of switchpin 180. Switch off pin 226 further includes an engagement region 230, which is accessible to the user via, for example, alien wrench 232. Should the user desire to manually shut off the pump, switch off pin 226 may be engaged via engagement region 230 and urged towards the right hand side of the Figure. Head 228 moves against lip 189 of switchpin 180 and urges the switchpin in the same direction, thereby releasing switchball 92 and shutting off the pump in the manner described above. The pump can be reset by moving the switch release pin back to its original position (i.e. the position in FIGS. 7 10 and 13). In one embodiment, the switch release pin is reset by manually inserting a rod or other similar device into a chamber in the hub in order to push the switch release sleeve and compress piston spring 48—returning the switch release pin back to its original position. As the switch release pin is pushed towards the left side of the figures, the switch release ball reaches the contoured end 96 of the switch release pin and is released from seat 100. Accordingly, the entire mechanism is returned to the position shown in FIGS. 7 and 13 and the pump resumes operation. It will be appreciated that in some embodiments the rod is permanently situated within the pump assembly such that the user is able to reset the assembly by essentially pressing a button (i.e. the terminal end of the rod, or a mechanism connected thereto.)

Figure 18:
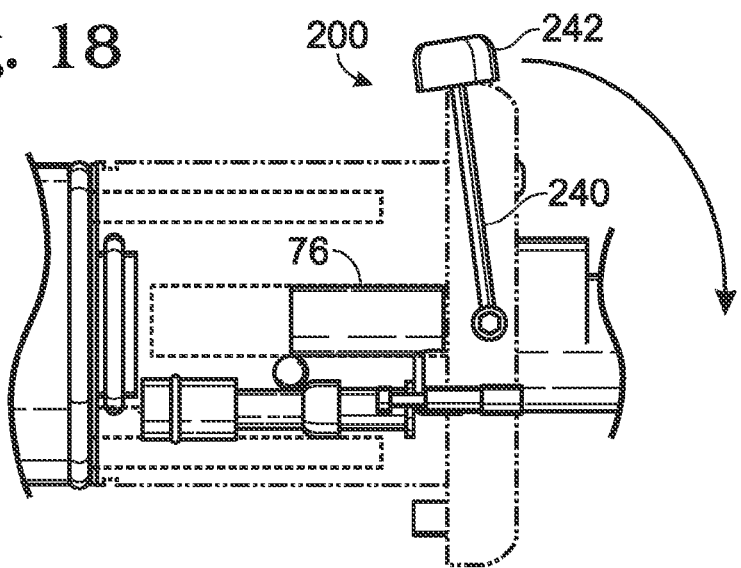
FIG. 18 is a close-up partial view of the pump of FIG. 13 rotated around the longitudinal axis showing the cocking mechanism in its resting position after the pump has been shut off.
Figure 19:
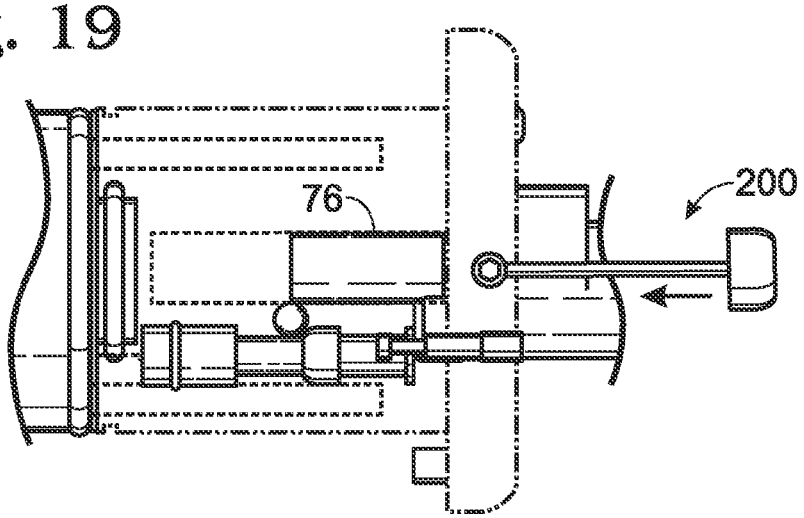

An exemplary recocking mechanism 200 is shown in FIGS. 18-20. While shown in conjunction with the switch assembly shown in FIG. 13, it will be appreciated that this cocking mechanism could be used with other embodiments or combinations of embodiments described herein. The presently described cocking mechanism includes a rod 240 having at its distal end a button 242. The rod is movably connected to the pump such that when it is rotated 90°, it can be urged into the pumping mechanism through a recess and engage with switch release pin 76 and then, as shown in FIGS. 19 and 20, push switch release pin 76 until ball 92 is urged up onto curved surface 184 of switch pin 180, thereby returning the pump to the locked, "on," position.

The hub pump assembly described herein comprises a number of components. Many of these components, such as check valves and o-rings will be familiar to those of skill in the art. Those of skill in the art will also be familiar with a wide variety of components, materials, and mechanisms which are suitable for use as a check valve or o-ring and such various components, materials, and mechanism are believed to be within the scope of the present disclosure. Accordingly, the check valves described herein may be formed from various suitable membranes, employ a ball and cap assembly, electronic components, or the like and still remain within the scope of the present disclosure. Furthermore the various o-rings described herein may be formed from any suitable material. Alternatively, other mechanisms for providing a sealed chamber, including the use of fluids or other materials may be employed.

It will be appreciated that the hub pump assembly described herein may be provided as a cartridge which can be inserted into a wheel. Once inserted, the hub pump assembly may or may not be removable. The insertion of the cartridge may be performed during manufacture of the wheel, at the point-of-sale, or by an end-use consumer. Alternatively, the hub pump assembly may be manufactured as part of the wheel.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

Inventions embodied in various combinations and subcombinations of features, functions, elements and/or properties may be claimed in a related application. Such claims, whether they are directed to a different invention or directed to the same invention, whether different, broader, narrower or equal in scope to any original claims, are also regarded as included within the subject matter of the inventions of the present disclosure.

The present disclosure, including the background, may make reference to various applications, disclosures, patents, and/or other references (collectively "references"). Unless specifically stated to the contrary, all references identified in this disclosure are hereby incorporated by reference.

What is claimed is:

1. A tire inflation device comprising:
   a pump assembly configured to be housed within a hub of a wheel, the pump assembly including:
   a piston capable of engaging in reciprocating motion, wherein the piston has a cammed surface and is configured such that the motion of the piston as it reciprocates is axial with respect to the axis of rotation of the wheel;
   a hub actuator that is rotationally fixed relative to the axle of the wheel when the pump is operating, the hub actuator being configured to ride the cammed surface of the piston, thereby driving the reciprocating motion of the piston as the wheel is rotated; and
   a switch assembly housed within the wheel's hub configured to unlock the actuator from the axle when the terminal tire pressure is reached, the switch assembly comprising:
   a switch release ball operably engaged with a switch release pin;
   a switchpin housed within a switchpin channel;
   a switchball operably engaged with the switchpin, a switchspring, and the switch release ball; and
   a switch release sleeve configured to move in concert with the switch release pin and operably engaged with the piston; wherein
   when the pump is operating and tire has not yet reached the terminal tire pressure, the switchspring urges the switchball against the switchpin such that the switch release ball is in contact with and balanced against the switchball, thereby locking the switch release sleeve against the piston, the piston against the actuator, and the actuator to the axle; and when the terminal tire pressure is met, air that is being forced out of the air chamber by movement of the piston places sufficient pressure on the switchpin to cause movement of the switchpin, thereby allowing the switch release ball to move relative to the switch release pin, thereby releasing the switch release sleeve from the piston, the piston from the actuator, and the actuator from the axle.

2. The tire inflation device of claim 1 further comprising a resistance mechanism configured to urge the piston towards the actuator.

3. The tire inflation device of claim 1 wherein the motion of the piston in a first direction creates an air chamber within the wheel hub and the motion of the piston in a second direction causes air within the air chamber to be expelled from the chamber.

4. The tire inflation device of claim 3 wherein the expelled air is forced into an air hose which is fluidly coupled to the tire.

5. A hub-enclosed tire pump comprising:
a piston having a cammed terminal surface housed within a wheel hub housing;
an actuator housed within the wheel hub, wherein when the pump is operating:
the actuator is rotationally fixed to the axle of the wheel, and
communicates with the cammed surface of the piston such that rotational movement of the actuator results in reciprocating motion of the piston in an axial direction relative to the wheel's axle;
an air line in fluid communication with the wheel hub housing and wherein the expelled air enters the air line;
a switch configured to release the actuator from its locked rotation engagement with the axle when a terminal tire pressure is reached; the switch comprising:
a switch release ball operably engaged with a switch release pin;
a switchpin housed within a switchpin channel; and
a switchball operably engaged with the switchpin, a switchspring, and the switch release ball;
a switch release sleeve configured to move in concert with the switch release pin and operably engaged with the piston; wherein
when the pump is operating and the tire has not yet reached the terminal tire pressure, the switchspring urges the switchball against the switchpin such that the switch release ball is in contact with and balanced against the switchball, thereby locking the switch release sleeve against the piston, the piston against the actuator, and the actuator to the axle; and when the terminal tire pressure is met, air that is being forced out of the air chamber by movement of the piston places sufficient pressure on the switchpin to cause movement of the switchpin, thereby allowing the switch release ball to move relative to the switch release pin, thereby releasing the switch release sleeve from the piston, the piston from the actuator, and the actuator from the axle and
wherein when the pump is not operating:
the actuator is rotationally freed from the axle of the wheel.

6. The hub-enclosed tire pump of claim 5 wherein motion of the piston in one direction results in the intake of air into the wheel hub housing and motion of the piston in another direction results in the expulsion of air from the wheel hub housing.

7. A tire pump cartridge for insertion into the hub of a wheel, the cartridge comprising:
a self contained pump assembly comprising a piston having a cammed surface configured to move axially with respect to the axis of rotation of the wheel;
a hub actuator that is rotationally fixed relative to the axle of the wheel when the pump is operating, the hub actuator being configured to ride the cammed surface of the piston, thereby driving the reciprocating motion of the piston as the wheel is rotated; and
a switch assembly housed within the wheel's hub configured to unlock the actuator from the axle when the terminal tire pressure is reached, the switch assembly comprising:
a switch release ball operably engaged with a switch release pin;
a switchpin housed within a switchpin channel;
a switchball operably engaged with the switchpin, a switchspring, and the switch release ball; and
a switch release sleeve configured to move in concert with the switch release pin and operably engaged with the piston; wherein
when the pump is operating and tire has not yet reached the terminal tire pressure, the switchspring urges the switchball against the switchpin such that the switch release ball is in contact with and balanced against the switchball, thereby locking the switch release sleeve against the piston, the piston against the actuator, and the actuator to the axle; and
when the terminal tire pressure is met, air that is being forced out of the air chamber by movement of the piston places sufficient pressure on the switchpin to cause movement of the switchpin, thereby allowing the switch release ball to move relative to the switch release pin, thereby releasing the switch release sleeve from the piston, the piston from the actuator, and the actuator from the axle.

* * * * *